ered June 1, 1965

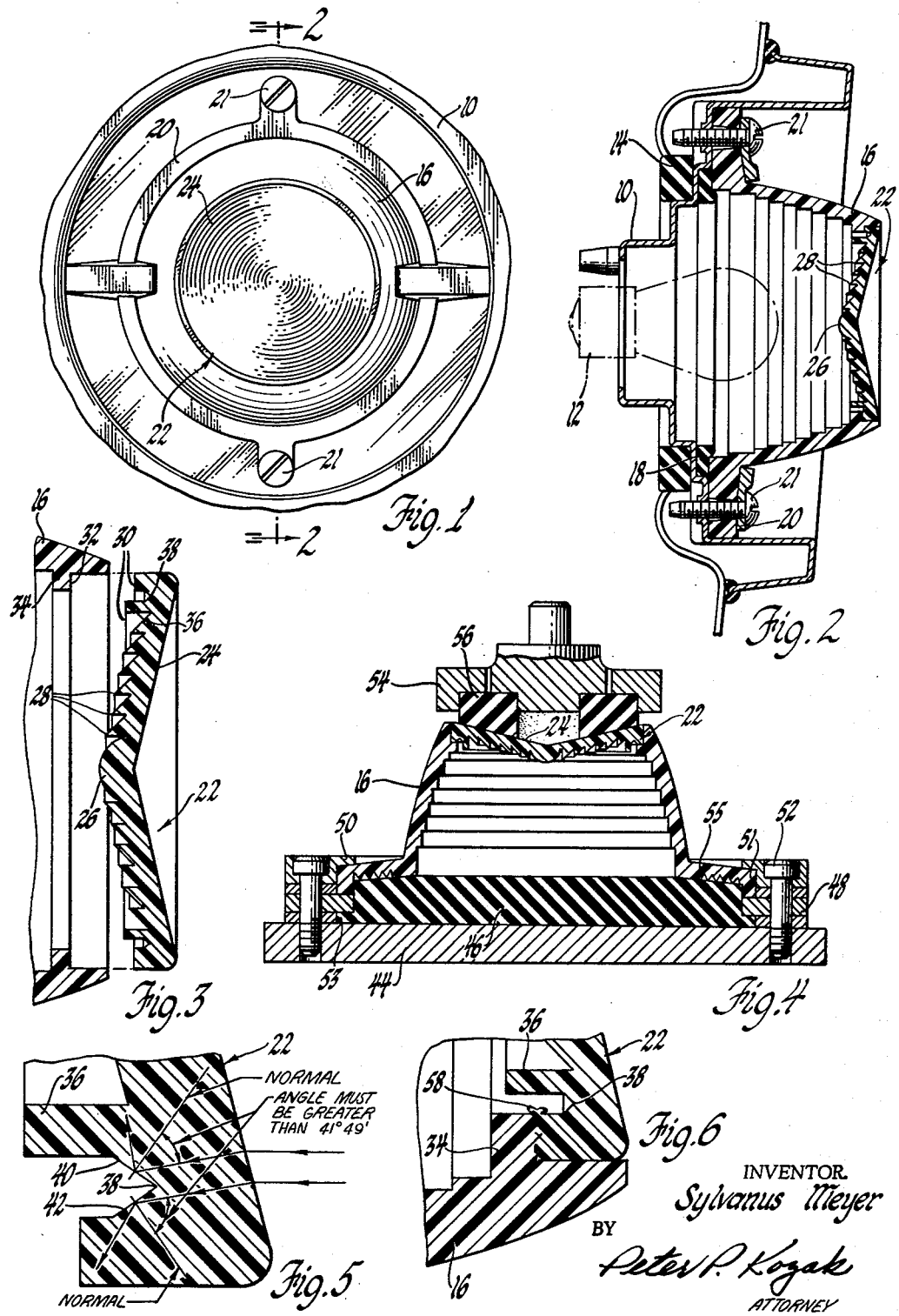

3,187,177
LENS
Sylvanus Meyer, Anderson, Ind., assignor to General Motors Corporation, Detroit, Mich., a corporation of Delaware
Filed Dec. 12, 1962, Ser. No. 244,159
4 Claims. (Cl. 240—106)

This invention relates to lenses for lamps and particularly those made of a thermoplastic synthetic resin such as methyl methacrylate resin.

It is known to manufacture signal type lamps for use, for example, at the rear of an automobile, which include a generally circular, disk-like lens element made of a thermoplastic synthetic resin and an annular thermoplastic resin body member adapted for supporting the lens suitably spaced from the source of light which are bonded or welded together by a spin welding technique in which one of these members is rotated at a relatively high rate of speed while in contact with the other whereby the contacting plastic material of each member is softened due to the frictional heat generated and permitted to fuse.

While the spin welding technique is efficient and economical, one disadvantage of employing it to bond the lens element to the body element is that in the welding process a bead or flash of the plastic material is formed at the edges of the fused joint which may be seen through the lens element and presents an unsightly appearance.

It is the basic object of this invention to provide a thermoplastic resin lamp structure in which the lens element is spin-welded onto the supporting thermoplastic resin body member and the flash or bead generated in the spin welding operation is hidden from view. A further object of this invention is to provide a thermoplastic resin lens element adapted for spin welding onto a thermoplastic resin support member which is provided with optical ring and baffle means operative to enclose and conceal from view the flash generated by the spin welding operation. These and other objects are accomplished by a thermoplastic resin lens structure having a peripheral annular bonding surface adapted to be spin-welded to an annular surface of a support member, a baffle ring positioned a short radial distance radially inwardly of the lens bonding surface and an optical ring located between the bonding surface and the baffle ring which is operative to substantially totally reflect light. In the spin welding operation the flash is received back of the optical ring and contained between the bonding surface and the baffle ring whereby the flash is hidden from view.

Other objects and advantages will be apparent from the following detailed description of the invention, reference being made to the accompanying drawings, in which:

FIGURE 1 is an elevation view of a signal lamp embodying the invention;

FIGURE 2 is a cross-sectional view taken along line 2—2 of FIGURE 1;

FIGURE 3 is an exploded view of the lens element and a portion of the body member of the signal lamp shown in FIGURES 1 and 2;

FIGURE 4 is a cross-sectional view of the lens and body members positioned in a fixture preparatory to spin welding the lens element to the body member;

FIGURE 5 is an enlarged fragment of the lens element shown in FIGURE 3; and

FIGURE 6 is an enlarged fragment of the lens and body member of FIGURE 2.

The lamp involved in this invention apart from the lens structure may be of any suitable design. The lamp shown in FIGURES 1 and 2 includes a metal housing member 10 adapted for mounting on the car body in which there is mounted by any suitable means a source of light in the form of an electric light bulb 12. The metal housing member 10 is preferably mounted on the automobile body in sealed relationship by means of a rubber gasket 14 interposed between the housing 10 and the car body (not shown). Mounted within the housing 10 is a hollow, partially conical lamp body support member 16 formed of a thermoplastic synthetic resin such as methyl methacrylate resin. An annular gasket 18 interposed between the lamp body member 16 and the housing member 10 provides a seal between these members. A retaining ring 20 held in place by the screws 21 which are threadably attached to the housing member 10 holds the plastic lamp body member 16 in sealed engagement with the gasket 18. Mounted at the outer end of the body is the lens element 22, the structure of which and the method of mounting it in the body member 16 will be described in detail hereinafter.

As best seen in FIGURE 3, the lens element 22 of this invention consists of a disk-like member formed preferably of methyl methacrylate resin having an inverted conical outer configuration 24 and an inner configuration including a central dioptric portion 26 surrounded by a series of catadioptric rings 28. The outer edge of the lens is provided with an annular flat radial surface 30 adapted to engage the radially flat surfaces 32 of a radially extending shoulder or ring 34 integrally formed within the lens support member 16. Intermediate the bonding surface 30 of the lens and the outermost catadioptric ring there is provided an annular baffle 36 projecting axially inwardly of the lamp assembly. Between the baffle 36 and the bonding surface 30 there is provided an optical ring 38 which as will be hereinafter described is capable of substantially totally reflecting light.

As shown in FIGURE 5, the optical ring 38 consists of a depression or groove on the rear side of the lens element having a triangular configuration including the side 40 and the side 42 of preferably equal length. The side 40 is disposed at an angle such that a light wave entering the lens axially thereof from the front side will strike the side 40 of the optical ring at an angle of at least 41°49' to a line drawn normal to the side 40. Similarly the side 42 is disposed at an angle such that a light wave entering the lens axially thereof will strike the side 42 at an angle of at least 41°49' to a line drawn normal to the side 42. In other words, the sides 40 and 42 of the optical ring form an annular right cone of a configuration such that light rays entering the lens from an outside source have an angle of at least 41°49' to lines which are normal to these sides so that the light is totally reflected thereby and no light enters the space behind these sides. It will be understood that the precise location of the sides 40 and 42 will be dependent upon the angle of the outer surface 24 of the lens since the angular placement of this surface determines the angle at which the light rays will strike the sides 40 and 42. Any configuration may be used for the optical ring which will have the property of totally reflecting light entering the lens from an outside source.

In accordance with the invention, the lens element 22 is spin-welded to the support member 16. To this end, the support 16 may be non-rotatably secured in a fixture including a base 44 and a rubber pad 46 positioned on the base 44 and clamped thereto by means of the annular plate 48. The support 16 is positioned over the pad 46 and clamped thereover by means of the clamping ring 50 which engages the annular ring 51 of the support member. The clamping ring 50 and the clamping ring 48 are each subjected to clamping pressure by means of the bolts 52 threadably secured in the base plate 44 whereby these plates hold the ring 51 yieldingly against the base 44 through an annular edge 53 of the pad 46. The base 55 of the support member 16 yieldingly rests on the pad 46 whereby it may be subjected to substantial axial compressive force in the spin welding operation. The lens element 22 is then positioned in the support 16 so that the bonding surface 30 thereof engages the bonding surface 32 of the support 16. Thereafter a spindle 54 drivingly attached to suitable power means (not shown) having the rubber pads 56 attached to the base thereof is lowered into engagement with the lens 22 as shown and rotated at a relatively high rate of speed whereby the rubber pads 56 of the spindle due to frictional engagement cause the lens 22 to rotate rapidly whereby the contacting surfaces 30 and 32 are softened due to the frictional heat generated in the spinning operation. The spindle 54 is then stopped and pressure is maintained between the lens and support 16 and 22 until the softened plastic parts fuse and harden to effect a weld. Preferably to more efficiently perform the spin welding operation, the base 44 may be mounted on a rotatable table which is initially held in a non-rotatable position to permit the lens element 22 to spin relative to the support member 16 and after a predetermined time sufficient to cause a melting or softening of the abutting surfaces, the supporting table is released whereby the base 44 and the support 16 are permitted to spin along with the spindle 54 to permit the bonding to occur while the parts are still spinning.

As shown in FIGURE 6, the spin welding operation results in a flash or bead 58 which is retained in the inner side of the bonding surface and the baffle 36 and is hidden from view beyond the optical element 38. Preferably the thermoplastic material for use in making the lens element 22 as well as the support element 16 is methyl methacrylate or ethyl methacrylate resin. The angular positioning of the elements of the optical ring 38 as described above is given for this material. It will be understood, of course, that other synthetic resin materials may be employed in making these elements and the angular placement of the optical ring 38 will, of course, vary somewhat depending upon the index of refraction of the material.

While the embodiment of the present invention as disclosed herein constitutes a preferred form, it is to be understood that other forms may be adopted without departing from the spirit of the invention.

I claim:

1. A lens having an outer reflecting side and an inner side, a thermoplastic rim on said inner side projecting axially therefrom and adapted to be spin welded to a thermoplastic surface of a lens support member, an optical ring disposed radially inwardly of said rim and adjacent thereto capable of totally reflecting light entering said lens from said outer side and an annular baffle disposed adjacent said optical ring radially inwardly thereof and extending axially a greater distance than said rim, said rim and said baffle forming an annular cavity therebetween operative to contain the flash produced in spin welding said lens to a support member axially of said ring.

2. A lens for signal lamps having an outer reflecting side and an inner side, a plurality of concentric arcuate catadioptric members on one side thereof adapted to concentrate light from a source on said inner side, a rim of thermoplastic material on said inner side projecting axially therefrom adapted to be spin welded to a thermoplastic surface of a lens support member with incidental production of flash, an optical ring disposed radially inwardly of said rim and adjacent thereto capable of totally reflecting light entering said lens from said outer side, and an annular baffle disposed adjacent said optical ring radially inwardly thereof and extending axially a greater distance than said rim, said rim and said baffle forming an annular cavity for containing said flash axially of said ring.

3. A lens for signal lamps having an outer reflecting side and an inner side, a plurality of concentric arcuate catadioptric members on one side thereof adapted to concentrate light from a source on said outer side into a beam of substantially parallel rays to give a high intensity signal, a rim of thermoplastic material on said inner side projecting axially therefrom adapted to be spin welded to a thermoplastic surface of a lens support member, an annular baffle on said inner side between said catadioptric members and said rim projecting axially substantially beyond said rim and an annular optical ring disposed between said baffle and said rim capable of totally reflecting light from the outer side of said lens, said baffle and said rim forming an annular cavity operative to contain the flash produced in spin welding said lens to said support member.

4. An article comprising a lens member having an outer reflecting side and an inner side, and a rim of thermoplastic material on said inner side extending axially thereof and a second member having an annular surface of thermoplastic material engaging a surface of said rim and being joined by means of a spin weld, said lens member having an optical ring adjacent said rim capable of totally reflecting light entering said lens member from said outer side, and an annular baffle disposed adjacent said ring extending axially from said lens member a distance substantially greater than said rim, said rim and said ring and said baffle forming an annular cavity therebetween containing the flash produced in said spin weld axially of said ring.

References Cited by the Examiner
UNITED STATES PATENTS

| | | | |
|---|---|---|---|
| 2,827,560 | 3/58 | Martin | 240—106 |
| 2,884,835 | 5/59 | Rupert | 18—59 |
| 2,981,827 | 4/61 | Orsatti et al. | 240—106 |

NORTON ANSHER, *Primary Examiner.*

J. SCHNALL, *Examiner.*